No. 791,365. PATENTED MAY 30, 1905.
G. PROKOFIEW.
AUTOMATIC WEIGHING MACHINE.
APPLICATION FILED FEB. 13, 1905.

No. 791,365. PATENTED MAY 30, 1905.
G. PROKOFIEW.
AUTOMATIC WEIGHING MACHINE.
APPLICATION FILED FEB. 13, 1905.

No. 791,365. PATENTED MAY 30, 1905.
G. PROKOFIEW.
AUTOMATIC WEIGHING MACHINE.
APPLICATION FILED FEB. 13, 1905.
8 SHEETS—SHEET 4.

No. 791,365. PATENTED MAY 30, 1905.
G. PROKOFIEW.
AUTOMATIC WEIGHING MACHINE.
APPLICATION FILED FEB. 13, 1905.

Patented May 30, 1905.

UNITED STATES PATENT OFFICE.

GEORGE PROKOFIEW, OF KENSAL RISE, ENGLAND.

AUTOMATIC WEIGHING-MACHINE.

SPECIFICATION forming part of Letters Patent No. 791,365, dated May 30, 1905.

Application filed February 13, 1905. Serial No. 245,492.

*To all whom it may concern:*

Be it known that I, GEORGE PROKOFIEW, engineer, a subject of the Emperor of Russia, residing at 129 Bathurst Gardens, Kensal Rise, in the county of Middlesex, England, have invented certain new and useful Improvements in or Connected with Automatic Weighing-Machines, of which the following is a specification, reference being had to the drawings hereunto annexed and to the letters marked thereon.

The invention relates to improvements in or connected with automatic weighing-machines more especially intended for weighing granular material; and the object thereof is to obtain a simple and inexpensive machine which will accurately weigh the material to within a small fraction and efficiently do the work of the more complex and costly mechanisms employed for that purpose.

In the accompanying drawings, Fig. 12$^a$ is a side elevation, partly in section, of the complete machine.

Figures 10, 11:
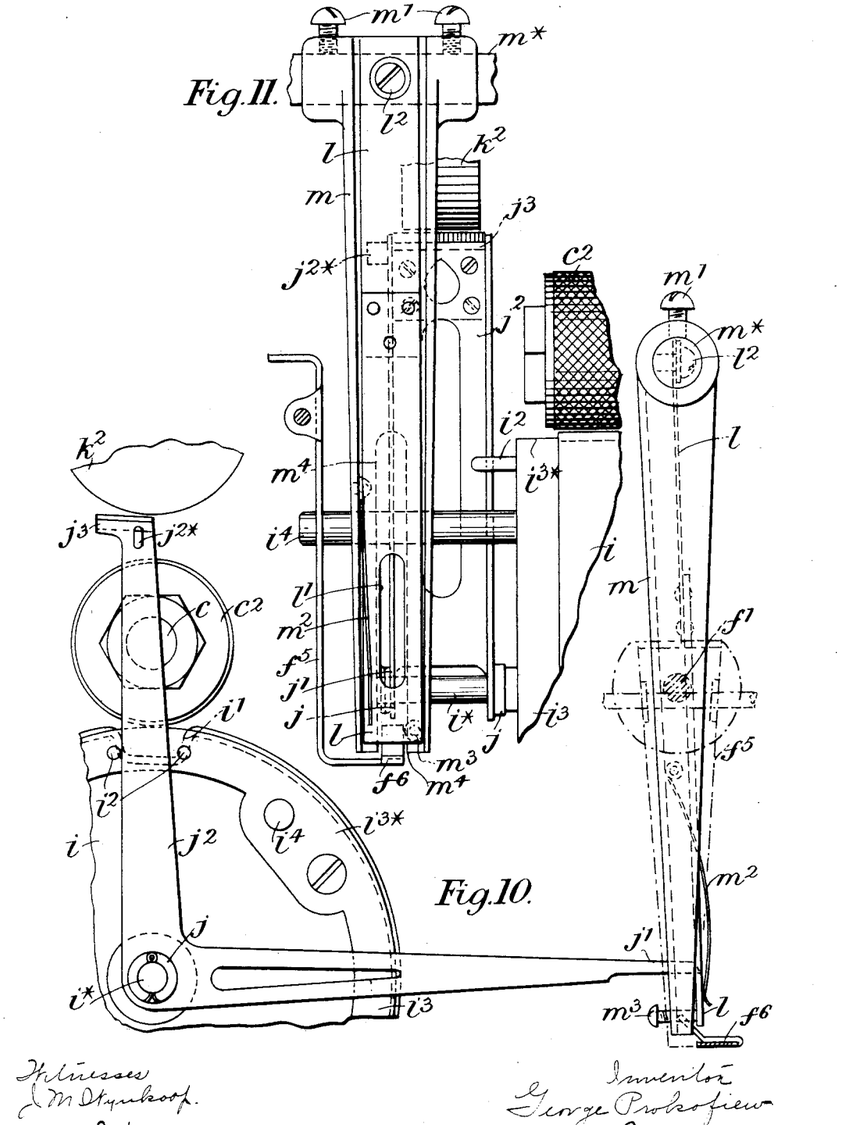
Fig. 10 is a front end elevation of parts, showing more particularly the means for giving an initial impulse to the cam-wheel.
Fig. 11 is a side elevation thereof.
Figure 12:
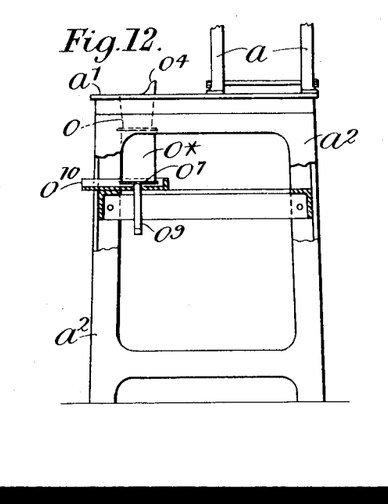
Fig. 12 is a sectional side elevation of the main part of the frame of the machine separately.
Figure 12A:
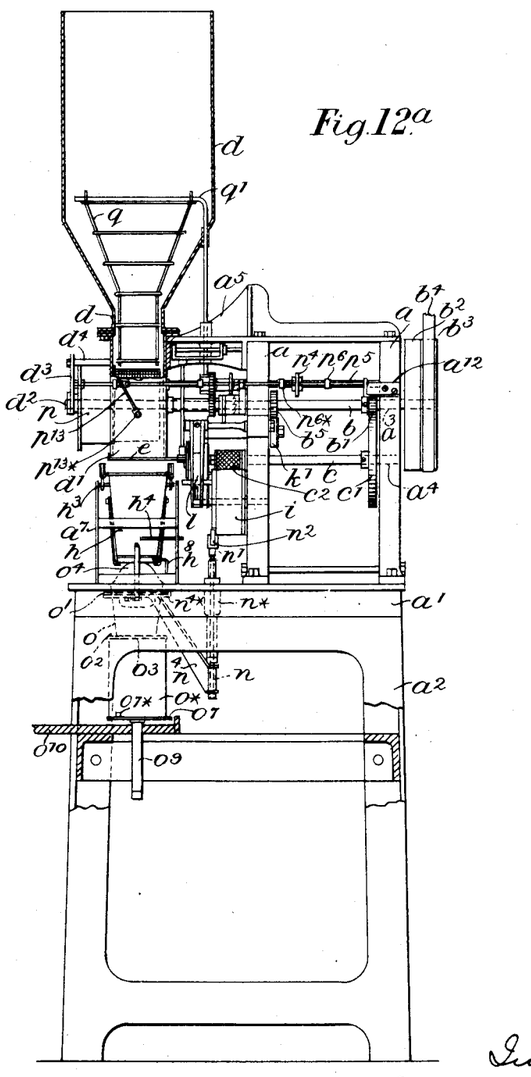

In the several figures like parts are indicated by similar letters of reference, Fig. 12$^a$ being drawn to a reduced scale. Fig. 12 is drawn to a further reduced scale and Figs. 10 and 11 to an increased scale with respect to the other figures of the drawings.

Referring to Figs. 1 to 12$^a$, $a$ represents the main frame of the machine.

$a'$ is a base-plate or table to which the frame $a$ is bolted, and $a^2$ is an underframe supporting said table and some other parts.

$b$ represents the main shaft of the machine, which is revolubly mounted in bearings $a^3$, formed in the frame $a$, and this shaft is provided with the usual fast and loose pulleys $b^2 b^3$, by the fast one of which it is constantly driven by means of a belt $b^4$ from any suitable motor, or said shaft might be turned by hand or foot.

$c$ represents a counter-shaft which is revolubly mounted in bearings $a^4$ in the frame $a$, and said counter-shaft is coupled with the main shaft $b$ by means of a friction-pinion $b'$, fixed upon the latter, which engages a friction-wheel $c'$, fixed upon the former, and said gearing is so proportioned that the counter-shaft $c$ is driven at a comparatively slow rate of speed with relation to the main shaft $b$.

At one side of the frame $a$ of the machine is fixed upon a bracket or extension $a^5$ from said frame a hopper $d$, into which the material to be weighed is deposited, and the open lower end or mouth of the hopper, which is shaped to form a nozzle $d'$, is adapted to be closed by an arc-shaped shutter $e$, provided with an upturned edge or flange $e'$ to assist to make a tight joint, and said shutter is carried by the lower end of a swinging arm $e^2$, which at its upper end is fixed to a frame $e^3$, pivotally mounted upon a fixed shaft $e^{3*}$, carried by the extension $a^5$ of the frame $a$, and said shutter is actuated as hereinafter described. Below the hopper mouth or nozzle $d'$ is a frame-like scale-beam $f$, having a cross-bar $f'$ formed with knife-edges which rest in V-shaped notches $f^2$ or bearings formed in the upturned ends of a frame $f^3$, carried by a pillar $f^4$, fixed with the table $a'$. The scale-beam $f$ is at one end provided with a tray $g$ or receptacle for weights, and which is, by means of straps $g'$, suspended from knife-edge centers, and at the other end said beam is provided with similarly-suspended straps or stirrups $h'$, formed with eyes or loops $h^2$, which receive horizontal trunnions, studs, or projections $h^3$, fixed to a bucket $h$ near to the upper end or mouth thereof, so that the bucket may at the desired times hang suspended from the scale-beam $f$. The bucket $h$ is near to the bottom thereof provided with a similarly-disposed stud or projection $h^4$, which works in a vertical open-ended guide-slot $a^6$, formed in the lower part of one of a pair of standards $a^7$, bolted to the table $a'$ and constituting a supplemental frame.

When the required weight of material is deposited in the bucket $h$ and depresses that end of the scale-beam $f$ and the bucket consequently descends, the upper studs $h^3$ engage notches or bearings $a^8$, formed in the upper ends of the standards or supplemental frame $a^7$, and in the further descent of the scale-beam and bucket, which is accomplished in the manner hereinafter described, the loops or stirrups $h^2$ are disengaged from the upper trunnions or studs $h^3$ of the bucket $h$, leaving the same supported by the notches or bearings $a^8$ in the standards or supplemental frame $a^7$ perfectly free of the scale-beam $f$.

The lower end of the bucket $h$ is formed curved and closed by an arc-shaped shutter $h^5$, carried by the lower ends of a pair of forked arms $h^6$, pivotally suspended at $h^7$ from the bucket $h$, and one of which arms is cranked to avoid the projection $h^4$, and said shutter when the required weight is reached and the hopper-valve $e$ is closed is opened to discharge the contents of the bucket $h$ into a receptacle placed beneath the same by a swinging arm or lever $h^{10}$ at its upper end, fixed with a bracket $h^{11}$, pivotally mounted upon a fixed shaft $h^{12}$ at one end carried by the hopper $d$ and at the other end by the frame $a$. The swinging arm or lever $h^{10}$ is at its lower end provided with an adjustable boss $h^{13}$, carrying a pin $h^{14}$, and upon the shutter $h^5$ are fixed two projections $h^8$, between which the pin $h^{14}$ constantly works, so that in its swinging movements it is capable of engaging either one of said projections in either the elevated or depressed position of the bucket $h$.

Figure 1:
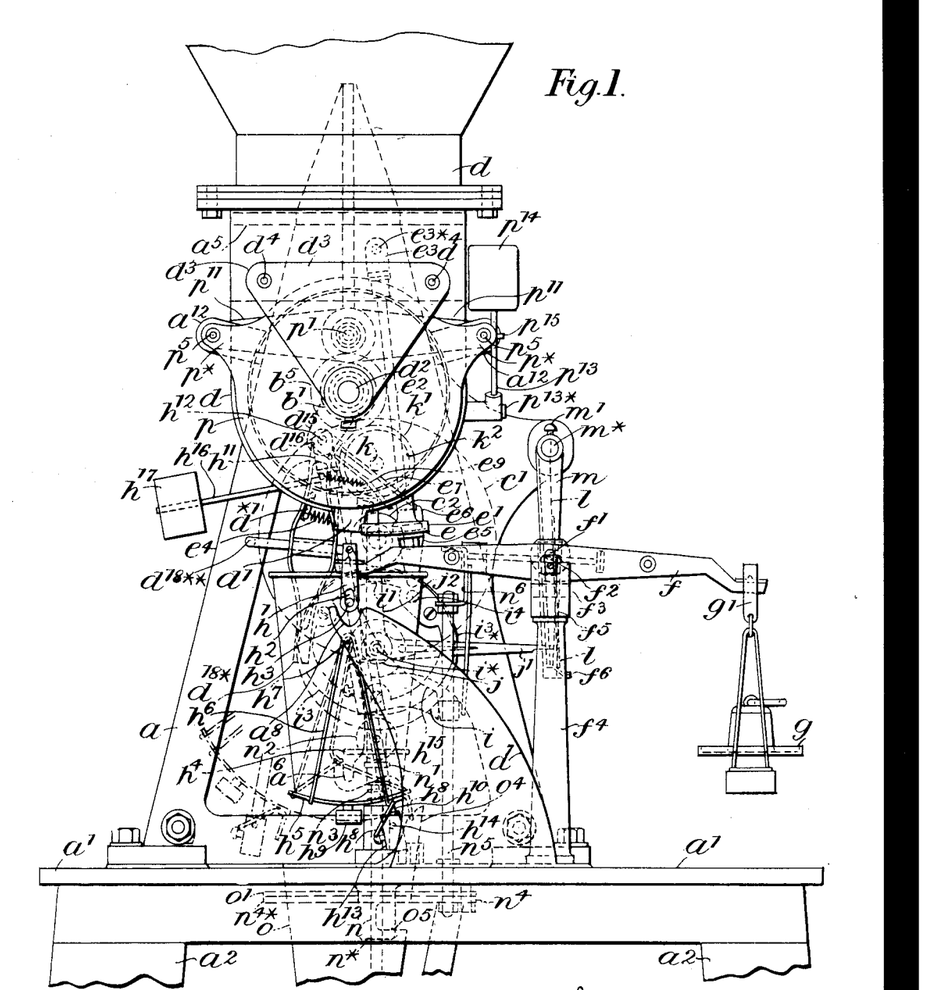
Figure 1 is a front end elevation, with the lower part broken away, of a machine constructed according to the present invention.
Figure 2:
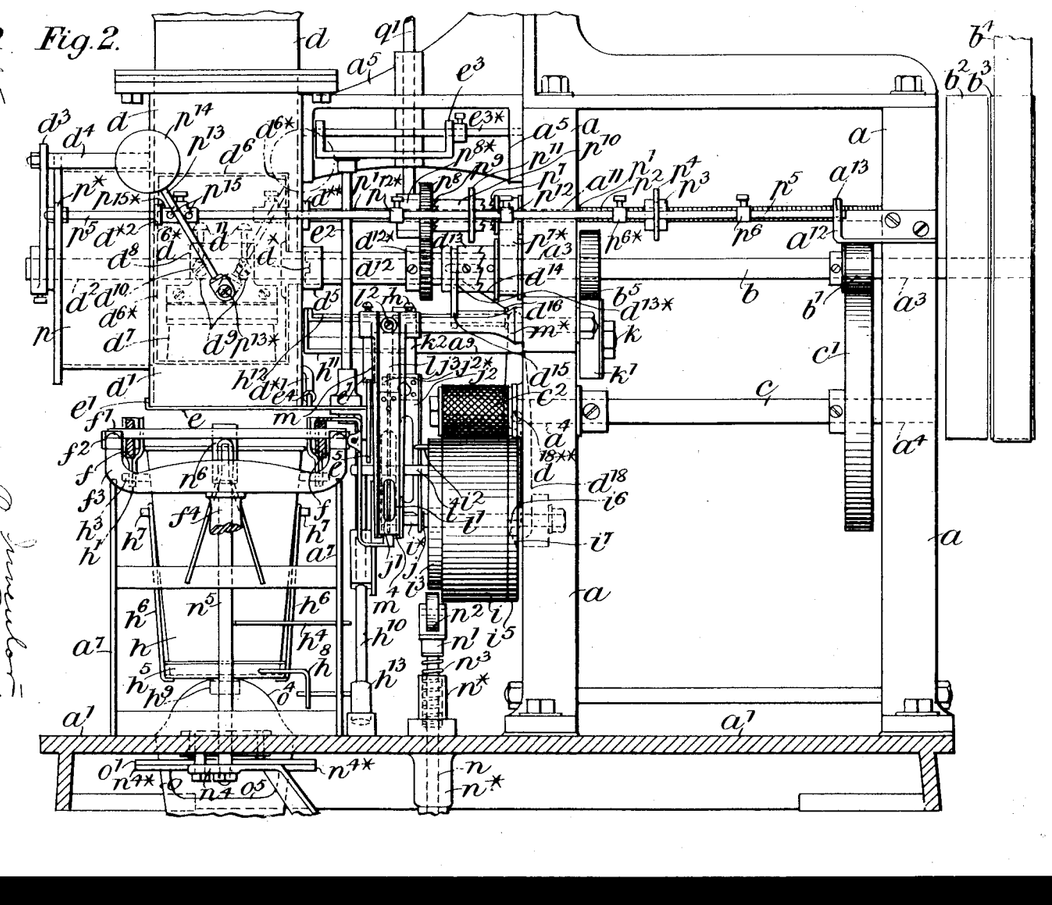
Fig. 2 is a side elevation thereof, partly in section.
Figure 3:
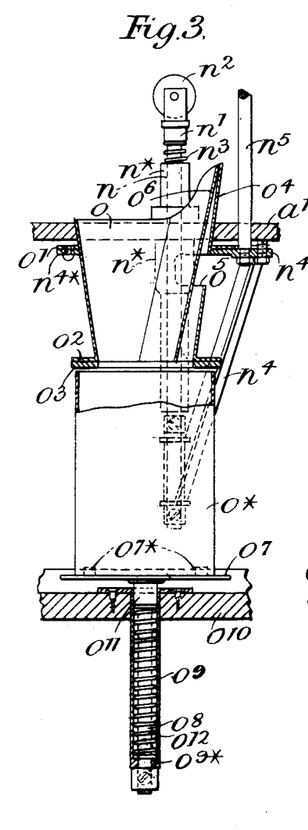
Fig. 3 is a similar view to Fig. 1, but partly in section, of a portion of the lower part of the machine.
Figure 4:
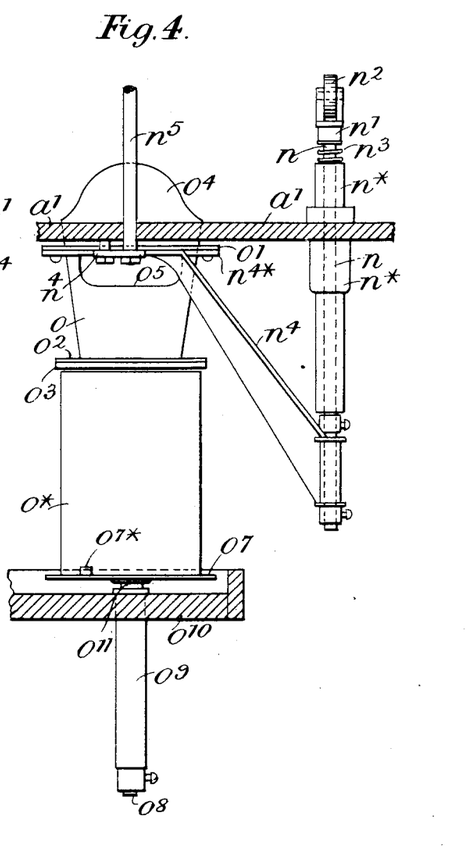
Fig. 4 is a side elevation, partly in section, of some parts represented in Fig. 3.
Figure 5:
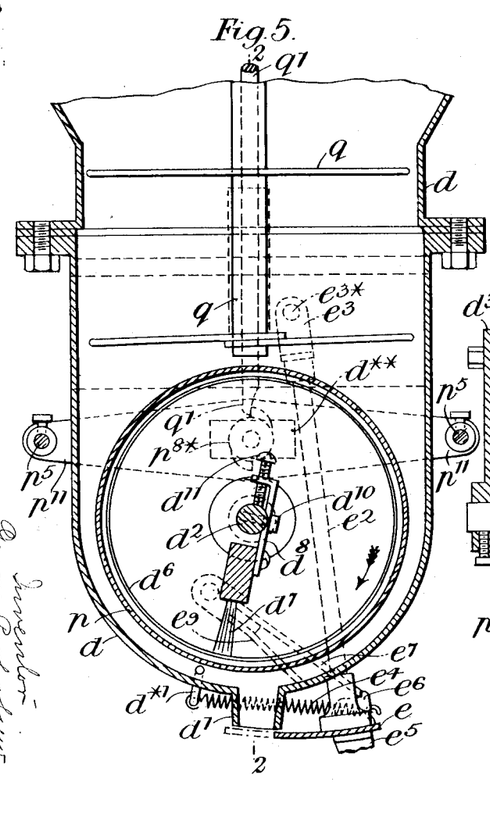
Fig. 5 is a vertical transverse section taken on the line 1 1 of Fig. 6 of the lower part of the hopper and adjacent parts.
Figure 6:
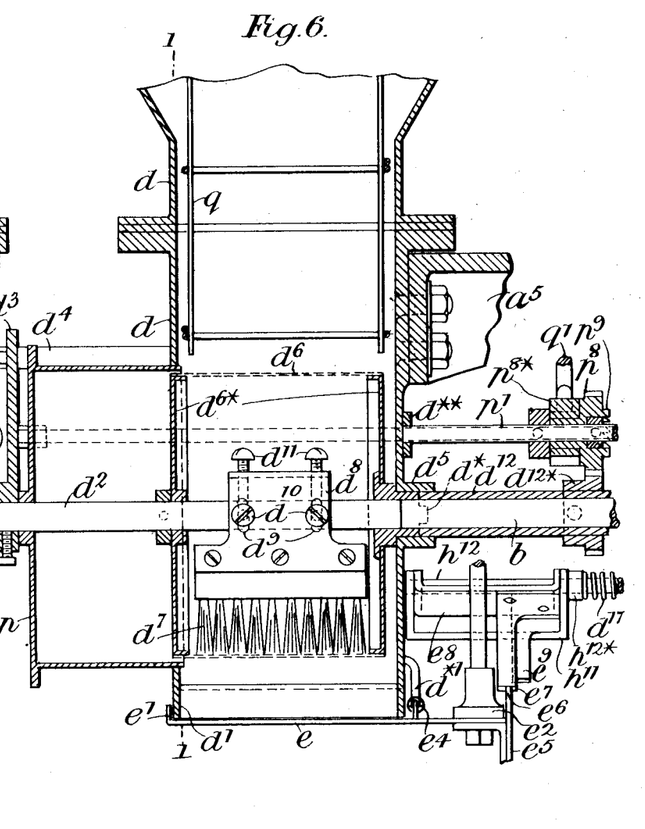
Fig. 6 is a vertical longitudinal section taken on the line 2 2 of Fig. 5.

Upon the swinging arm or lever $h^{10}$ is adjustably fixed a cam or incline $h^{15}$, and upon a cam-wheel $i^3$, hereinafter described, is fixed a pin $i^4$, which in the revolution of the cam-wheel $i^3$ engages the cam or incline $h^{15}$ of the swinging or pivotal arm or lever $h^{10}$ and at the required time swings said lever upon its axis and causes it, through the pin $h^{14}$ and one of projections $h^8$, to swing the shutter $h^5$ upon its axis $h^7$ into the position shown by the dotted lines in Fig. 1, so as to open the mouth of the bucket $h$ and discharge its contents. Upon the pin $i^4$ of the cam-wheel $i^3$ receding from the cam or incline $h^{15}$ the swinging arm or lever $h^{10}$ is restored to its normal position, as shown by the full lines in Fig. 1, carrying with it and closing the shutter $h^5$, and said parts are normally so retained by means of a weight $h^{17}$, carried by the end of a lever $h^{16}$, fixed with the swinging arm $h^{10}$, and the closing of the shutter $h^5$ is also assisted by a weight $h^9$, fixed beneath the same.

Fixed to the side of the frame $a$ below the level of the hopper $d$ is a stud $i^*$, upon which is mounted with capability of revolution a wheel or cylinder $i$, hereinafter called the "cam-wheel," the periphery of which is covered with india-rubber or the like and at a given point of its circumference is formed with a depression $i'$, and upon the end of the counter-shaft $c$ beyond the frame $a$ is fixed a roughened wheel $c^2$, which gears with the cam-wheel $i$, and in the normal position of the working parts of the machine—that is to say, when the hopper-valve $e$ is open—the depression $i'$ in the cam-wheel $i$ coincides with the roughened wheel $c^2$, so that no motion is given by the latter to the former. Mounted loosely by its boss $j$ upon a prolongation of the stud or axis $i^*$ of the cam-wheel $i$ is a bell-crank, one arm, $j'$, of which in the normal position of the cam-wheel $i$ projects horizontally at right angles to the axis thereof and the other arm, $j^2$, of which bell-crank extends vertically upward between two studs $i^2$, fixed upon the face of the cam-wheel $i$ and so spaced as to leave a certain amount of play between the studs and the arms. The extremity of the vertical limb $j^2$ of the bell-crank is formed with a horizontal enlargement $j^3$ and covered with leather or the like, and above the bell-crank and revolubly mounted in a bearing $a^9$ in the frame $a$ is a short shaft $k$, which extends through said frame and has fixed upon one end thereof a leather-covered wheel $k'$, or it might be a slightly-larger wheel $b^5$, fixed with the constantly-driven main shaft $b$, and upon the opposite end of the short shaft $k$ and immediately over the vertical arm $j^2$ of the bell-crank is fixed a roughened wheel $k^2$, which is thus constantly driven at a rapid rate.

The enlarged upper end $j^3$ of the vertical arm $j^2$ of the bell-crank in the normal position of the parts is held out of engagement with its coacting roughened wheel $k^2$ by means of a detent or support $l$, provided with an eye $l'$, or it might be an equivalent contrivance into which the extreme end or nose of the horizontal arm $j'$ of the bell-crank is received, so that it is locked against movement and through the vertical arm $j^2$ of the bell-crank and pins $i^2$ upon the cam-wheel $i$ retains said cam-wheel $i$ in its initial position. Projecting horizontally from the frame $a$ is a fixed stud $m^*$, upon which is adjustably fixed by set-screws $m'$ a depending trough-shaped arm $m$, to the upper part of which is fixed by a screw $l^2$ the upper end of the detent or support $l$, which lies within the trough or hollow of the arm $m$. The upper part of the detent or support $l$ is formed of spring ribbon-steel to afford the required flexibility, and the lower part thereof, in which is formed the eye $l'$, consists of more rigid material and is riveted to the upper part, and acting upon the back of the lower part of the detent or support $l$ and carried by the arm $m$ is a light spring $m^2$, which constantly presses upon the detent or support $l$ and serves to normally retain it in a given position, which is capable of regulation for the purpose of adjusting it with relation to the coacting arm $j''$ of the bell-crank by means of a set-screw $m^3$, screwing through a tapped hole in the lower part of the arm or frame $m$, and in order to enable the arm $j''$ of the bell-crank to have access to the support $l$ the back of the trough-shaped arm $m$ is formed for a suitable distance from the bottom end thereof with an open-ended slot $m^4$.

The scale-beam $f$ has fixed thereon centrally thereof a downward projection or arm $f^5$, which at its lower end is cranked and formed with an offset or foot $f^6$, adapted to engage the lower end of the support or detent $l$ of the horizontal arm $j''$ of the bell-crank at one side thereof and move it out of engagement with the arm $j''$, while the spring $m^2$ controls said outward movement.

When the required weight or nearly the required weight of material has run from the hopper $d$ into the scale-bucket $h$ and the scale-beam $f$ commences its descent, the offset or foot $f^6$ of the projection $f^5$ of the scale-beam disengages the support or detent $l$ from the horizontal arm $j''$ of the bell-crank, when said arm by its weight turns the bell-crank slightly upon its axis, which movement is permitted by the play between the studs $i^2$ on the face of the cam-wheel $i$ and the vertical arm $j^2$ of the bell-crank, and the enlarged upper end $j^3$ of said vertical arm is thus thrown into engagement with its coacting roughened wheel $k^2$. The wheel $k^2$ gives a forward impulse to the arm $j^2$ of the bell-crank, and through one of the studs $i^2$ a partial rotation to the cam-wheel $i$, thus instantly throwing the latter into gear with its coacting roughened wheel $e^2$, by which it is rotated at a comparatively slow rate of speed until its depression $i'$ again coincides with the roughened wheel $e^2$, when said motion ceases and the horizontal arm $j''$ of the bell-crank, which latter travels round with the cam-wheel $i$, again comes into engagement with the support or detent $l$.

The cam-wheel $i$ is provided with a cam $i^3$, beneath which is arranged a vertically-sliding rod $n$, which works in tubular guides $n^*$, fixed to the table $a'$, and the top end of the rod $n$ has fixed thereto a boss or fitting $n'$, which is forked or slotted and fitted with a roller $n^2$, which is adapted to constantly engage the cam $i^3$, except as hereinafter stated, and between the fitting $n'$ and tubular guide $n^*$ is arranged a spring $n^3$, which supports the weight of the rod $n$ and its connections. Fixed to the lower end of the sliding rod $n$ is a branch or bracket $n^4$, which comes against the under side of the table $a'$ and forms a stop to limit the upward movement thereof and of the rod $n$, and to this bracket is fixed the lower end of a rod $n^5$, the upper end of which is provided with a hook $n^6$. Thus in the revolution of the cam-wheel $i$ the cam $i^3$ depresses the vertically-sliding rod $n$ against the force of the spring $n^3$, and the hook $n^6$ of the rod $n^5$ engages the cross-bar of the scale-beam $f$, and consequently depresses the bucket end of said beam, and by reason of the shape of that part $i^{3*}$ of the cam which constitutes a dwell for the time being, thus retains it, thereby causing the bucket $h$ to rest by its upper studs or trunnions $h^3$ in the notched bearings $a^8$, provided for them in the supplemental frame or standards $a^7$; but in the normal or initial position of the cam-wheel $i$ the non-acting part of the cam $i^3$ is opposed to the roller $n^3$.

Figure 7:
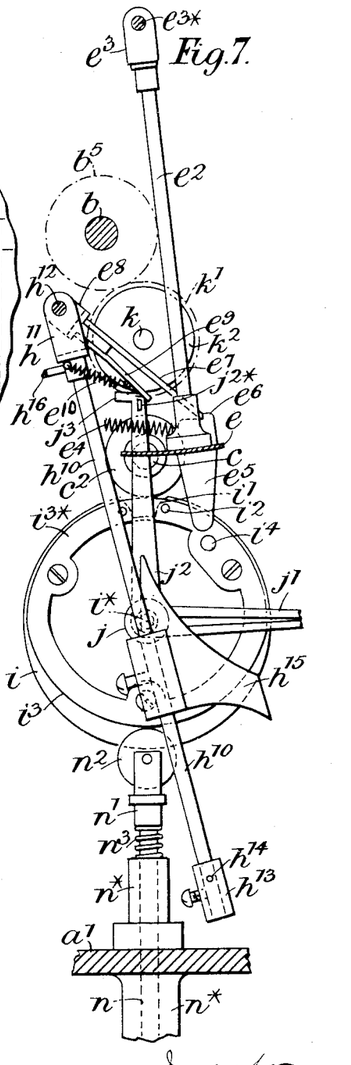
Fig. 7 is a front end view of parts illustrating more particularly the cam-wheel and some coacting parts.
Figure 8:
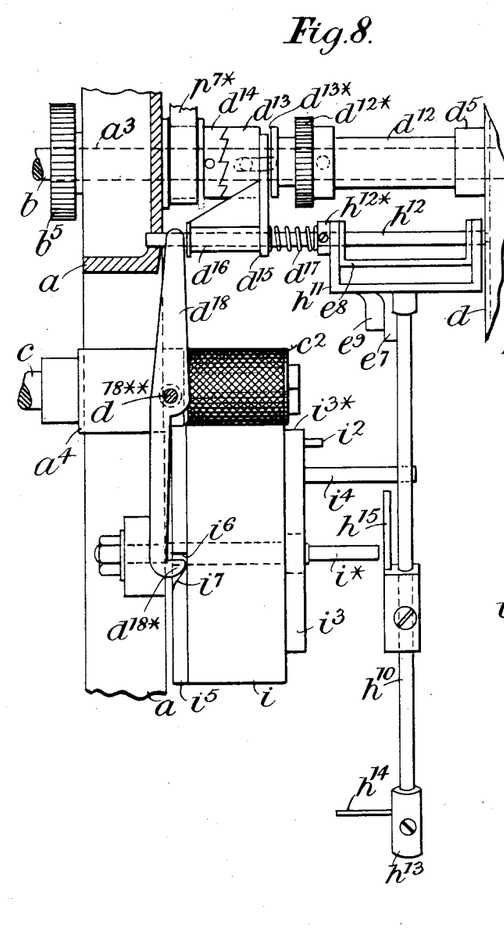
Fig. 8 is a side elevation opposite to Fig. 2 of parts illustrating more particularly the means for disconnecting the sieve from its shaft.
Figure 9:
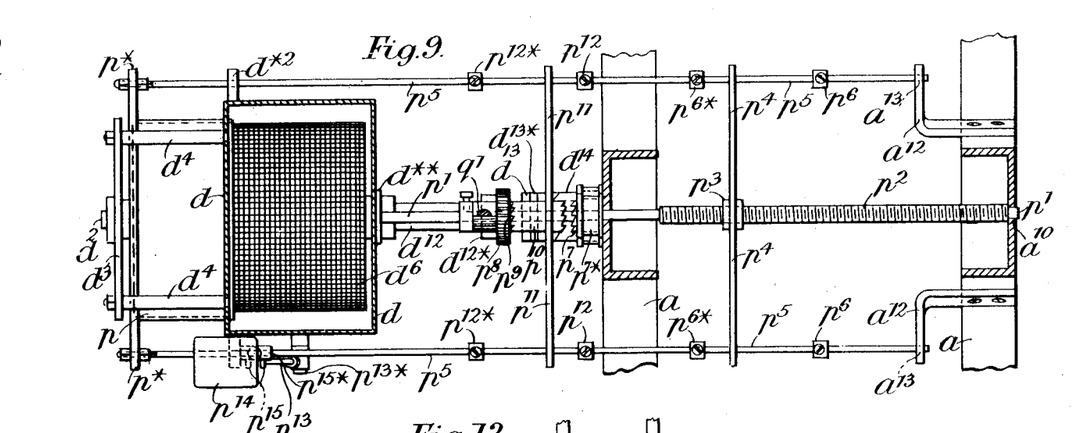
Fig. 9 is a sectional plan of parts, showing more particularly the sieve and its regulating means.

The swinging arm $e^2$ of the hopper-shutter $e$ is acted upon by a spring $e^4$ at one end attached to an eye $d^{*'}$ upon the lower part of the hopper $d$ and at the other end attached to the shutter $e$ to suddenly close the shutter, and said arm $e^2$ is provided with a nose $e^5$, and the cam-wheel $i$ is furnished with a long pin $i^4$, projecting from its face and hereinbefore referred to, which in the revolution of the cam-wheel $i$ as it approaches its initial or normal position engages and sweeps past said nose, thereby swinging the arm $e^2$ upon its axis and opening the shutter $e$, as shown more particularly at Fig. 7. The hopper-shutter $e$ is retained in its open position by a detent $e^7$, which engages a projection or shoulder $e^6$ on the top of the nose $e^5$ of the arm $e^2$, and said shutter is released at the required time, permitting the spring $e^4$ to suddenly close the same when the required weight of material is deposited in the bucket $h$ by the following means: The detent $e^7$ is carried by a fitting $e^8$, pivotally mounted upon the shaft $h^{12}$, and it is provided with a tail $e^9$, which is acted upon by a spring $e^{10}$, having one end attached to said tail and the other end attached to the bracket or fitting $h^{11}$ at the top of the arm or lever $h^{10}$, so as to normally depress it and hold it in engagement with the shoulder or projection $e^6$ of the nose $e^5$, while the detent $e^7$ is raised and tripped, so as to release the shutter $e$ at the required time by a projection $j^{2*}$ upon the arm $j^2$ of the bell-crank as said arm is moved by the wheel $k^2$ to give an initial impulse to the cam-wheel $i$, as hereinbefore described.

The parts are so timed and arranged that immediately the required weight is deposited in the bucket $h$ the projection $f^5$ of the scale-beam $f$ by its foot $f^6$ moves the support or detent $l$ from engagement with the horizontal arm $j''$ of the bell-crank, the enlargement $j^3$ of the vertical arm $j^2$ of said bell-crank is moved into gear with the driven wheel $k^2$, the detent $e^7$ is tripped by the projection $j^{2*}$ of said arm, and the hopper-shutter $e$ is suddenly closed by the spring $e^4$ and the cam-wheel $i$ is turned on its axis until it engages the roughened wheel $c^2$, by which it is rotated. In the further revolution of the cam-wheel $i$ after the last-described operation the long pin $i^4$ upon the cam-wheel $i$ engages the cam $h^{15}$ upon the swinging arm $h^{10}$ of the bucket-shutter $h^5$ and traverses the same against the action of its weight $h^{17}$, so that said arm, through its pin $h^{14}$ and one of the projections $h^8$ of the bucket-shutter, opens the same, as hereinbefore described, and discharges the contents of the bucket $h$, and in the further revolution of the cam-wheel $i$ its long pin $i^4$ recedes from the cam $h^{15}$ of the arm $h^{10}$, actuating the bucket-shutter $h^5$, permitting the weight $h^{17}$ to restore said arm to its normal position and close said shutter. Immediately after this operation the cam $i^3$ of the cam-wheel $i$ allows the vertically-sliding rod $n$ to rise to its normal position under the influence of its spring $n^3$, at the same time raising the hook $n^6$, thus permitting the scale-beam $f$ to rise also, during which movement the loops or stirrups $h'$ engage the upper studs or trunnions $h^3$ of and pick up and hold suspended the bucket $h$, ready for the next operation. In the further revolution of the cam-wheel $i$ and as the same approaches its initial position the long pin $i^4$ upon the face thereof encounters the nose $e^5$ of the swinging arm $e^2$ of the hopper-shutter $e$, carrying it back until it is engaged by its detent $e^7$, and the shutter is opened, as hereinbefore described, and by this time the horizontal arm $j'$ of the bell-crank has again been brought into engagement with the eye $l'$ of its support or detent $l$, and all parts are restored to their normal positions.

In discharging the material which has been weighed from the bucket $h$ of the scale-beam $f$ into a box or other receptacle designed to receive it a considerable amount of dust is created, and sometimes the material is liable to overflow the box or the like, and in order to prevent this a short chute $o$ is provided, which is designed to meet the bucket $h$, or nearly so. The chute $o$ fits into a ring or holder $n^{4*}$, formed on the branch or bracket $n^4$ from the vertically-sliding rod $n$, and said chute is provided with a flange $o'$, which is bolted to the ring or holder $n^{4*}$, thereby firmly fixing the chute, with the bracket or branch $n^4$, so that it partakes of the movements of the vertically-sliding rod $n$, and as the same is depressed by the cam $i^3$ of the cam-wheel $i$ to bring about the depression of the bucket $h$ the chute $o$ is also depressed.

The bottom edge of the chute $o$ is formed with an annular flange or rim $o^2$, faced with a ring of india-rubber $o^3$ or the like, and the box or receptacle $o^*$, into which the material from the scale-bucket $h$ is to be discharged, is adapted to be placed thereunder, so that upon the depression of the chute $o$ the ring of packing material $o^3$ will by the rim or flange $o^2$ be pressed upon the top edge of the box $o^*$ or the like, thus making a tight joint between those parts and preventing the escape of dust. The chute $o$ is at one side or part of its circumference formed with a kind of lip or flange $o^4$, which serves as a shield to prevent any part of the material discharged from the bucket $h$, and which naturally inclines to that side by reason of the direction in which the bucket-shutter $h^5$ opens, falling over the edge of the chute.

Inasmuch as the bottom edge of the chute $o$ tightly fits upon the top edge of the box $o^*$, the air contained in said box might when dealing with some kinds of material find a difficulty in escaping if the only vent were by way of the inlet, and it is therefore desirable to provide an independent vent through which the contained air can find an exit. For this purpose an opening $o^5$ is formed in the wall of the chute $o$ beneath the lip or flange $o^4$ and from the top edge of the lip to the bottom of the chute. The chute is at this part provided with an inner wall $o^6$, which is arranged at an angle to the general taper of the chute, so as to leave an airway open at the lower end to the box $o^*$ and with which the opening $o^5$ communicates, so that the air when the box $o^*$ is displaced by the falling material may readily find an exit through said way.

The downward movement of the chute $o$ is equal to that of the vertically-sliding rod $n$ and is greater than an ordinary rubber ring $o^3$ would allow, and therefore some further cushioning means is desirable, and in order to provide this a vertically-movable table $o^7$ is employed, upon which the box $o^*$ is supported. The table $o^7$ is carried by an axial spindle $o^8$, mounted with capability of vertical movement in a tubular guide or case $o^9$, extending through a perforation in a platform $o^{10}$ and fixed with said platform, and the spindle $o^8$ at its upper end is provided with a boss $o^{11}$, which loosely fits the case $o^9$, and at its lower end it passes through the contracted bottom end $o^{9*}$ of said case, beyond which it has adjustably fixed thereon a collar or stop which limits its upward movement. Around the spindle $o^8$, within the case $o^9$, is coiled a spring $o^{12}$, which at one end takes an abutment against the contracted end $o^{9*}$ of the case $o^9$ and at the other end bears against the boss $o^{11}$ and supports the table $o^7$ in a buffer-like manner. The upper surface of the table $o^7$ is provided with guide-studs $o^{7*}$ to facilitate the placing of the box $o^*$ in correct position with relation to the chute $o$.

In order to assist and automatically regulate the flow of material from the hopper $d$ into the scale-bucket $h$, and more especially when weighing some kinds of material, such as flour or cocoa, which are liable to pack, the following arrangement of parts is employed: The lower part of the hopper $d$ immediately above its mouth $d'$ is formed semicylindrical in shape, and passing axially through this semicylindrical part is a fixed shaft $d^2$, which at one end is mounted in a strap $d^3$, carried by studs or brackets $d^4$ from the lower part of the hopper $d$, at one side thereof, and at the other end is supported in a sleeve $d^{12}$, revolubly mounted in a boss or bearing $d^5$ at the other side of the hopper and made in two parts, united by a clutch-joint $d^*$, for facilitating the removal of the sieve $d^6$ and hereinafter more fully referred to. Upon the fixed shaft $d^2$ is revolubly mounted a cylindrical sieve $d^6$, having imperforate ends formed by disks $d^{6*}$, and said sieve receives rotary motion at the desired times, as hereinafter described. Within the cylindrical sieve $d^6$ is a brush $d^7$, which is carried by a holder $d^8$, embracing the fixed shaft $d^2$ and formed with slots $d^9$ therein, through which pass clamping-screws $d^{10}$, while set or adjusting screws $d^{11}$ are screwed through tapped holes in the cranked part of the holder $d^8$ and impinge upon the shaft $d^2$ and by the aid of which the position of the brush $d^7$ with relation to the sieve $d^6$ may be accurately adjusted. The brush $d^7$ is preferably narrow and in length coextensive with the cylindrical sieve $d^6$, or nearly so, and it is preferably located immediately over or slightly to the rear of the outlet $d'$ from the hopper, and the office of said brush is in the revolution of the sieve $d^6$ to sweep the same at that point, and thus clear the meshes of the sieve and cause the material to flow evenly and continuously from the hopper $d$ during the rotation of the sieve $d^6$.

Fitted loosely upon the cylindrical sieve $d^6$ with capability of sliding is an imperforate cylinder or regulator $p$, which is necessarily open at one end, but is closed at the other, and this regulator is automatically adjusted, as hereinafter described, so as to more or less inclose the cylindrical sieve $d^6$, and thus regulate the area thereof in action and diminish the flow of material through the hopper $d$ into the weighing-bucket $h$ as the quantity of material in the latter nearly approaches the required weight. One end of the cylindrical sieve has fixed therewith one end of a long sleeve $d^{12}$, which revolves upon or around part of the fixed shaft $d^2$ and in the bearing $d^5$, and the said sleeve also revolves upon and is supported by the end part of the constantly-driven main shaft $b$, as hereinafter more fully referred to. The opposite end of the sleeve $d^{12}$ has mounted thereon with capability of sliding one part, $d^{13}$, of a clutch, the other part, $d^{14}$, of which is fixed with the main constantly-driven shaft $b$, and the movable part $d^{13}$ of the clutch is provided with a circumferential groove $d^{13*}$, which is engaged by a fork $d^{15}$, carried by a tubular boss or sleeve $d^{16}$, mounted with capability of sliding upon the fixed shaft $h^{12}$ of the swinging arm $h^{10}$. The fork $d^{15}$ is acted upon in one direction by a spring $d^{17}$, which takes an abutment against a collar $h^{12*}$ upon the fixed shaft $h^{12}$ to throw the part clutch $d^{13}$ into engagement with that $d^{14}$, so that the cylindrical sieve $d^6$ is driven by the main shaft $b$, but is acted upon in the other direction to throw the part clutch $d^{13}$ out of action by one end of a balance-lever $d^{18}$, mounted upon an axis of motion $d^{18**}$, carried by the frame $a$, and the other end of which lever is formed with a rounded or hook-like nose $d^{18*}$, which rides upon a ring or cam $i^5$, provided at the back of the cam-wheel $i$, during the revolution of the latter and the discharge of the scale-bucket $h$ when the hopper-shutter $e$ is closed, and thus by throwing the part clutch $d^{13}$ out of action arrests the motion of the sieve during that period. As, however, the cam-wheel $i$ reaches its normal position when the hopper-shutter $e$ is opened and the cam-wheel $i$ for a time remains stationary, the hooked end $d^{18*}$ of the balanced lever $d^{18}$ falls into a recess $i^6$, provided in the ring or cam $i^5$, and thus permits the spring $d^{17}$ of the fork $d^{15}$ to act and throw the part clutch $d^{13}$ into gear with that $d^{14}$, fixed with the constantly-driven main shaft $b$, thereby setting the cylindrical sieve $d^6$ in motion, while in order that the lever $d^{18}$ may again ride up upon the ring or cam $i^5$ at the next revolution of the cam-wheel $i$ said ring or cam is provided with an incline $i^7$, extending to the bottom of the recess $i^6$.

Above the constantly-driven main shaft $b$ is another shaft, $p'$, which for part of its length is formed with a screw-thread $p^2$, upon which is fitted a nut $p^3$, and this shaft is at one end revolubly mounted in a bearing $a^{10}$ in the frame $a$, and at the other end it is mounted in a bearing $d^{**}$, carried by the hopper $d$, while at its mid-length it is supported in a bearing $a^{11}$, formed in another part of the framing $a$, and this shaft for the sake of distinction is hereinafter referred to as the "screw-shaft." Connected at one end with the imperforate cylinder or regulator $p$, by means of lugs $p^*$ upon the end thereof, are two rods $p^5$, which at the other end are mounted with capability of sliding in bearings $a^{13}$, formed in brackets $a^{12}$ from the frame $a$ and in bearings $d^{*2}$, formed in lugs upon the hopper $d$, and said rods are arranged exteriorly of the hopper $d$, on each side thereof and parallel with the screw-shaft $p'$. Fixed with the nut $p^3$ is a strap or cross-bar $p^4$, which at its ends is perforated to slide upon the rods $p^5$, and each rod is provided with a pair of adjustable stops $p^6$ $p^{6*}$, suitably spaced, between which the strap or cross-bar $p^4$ of the nut $p^3$ works, so that when the screw-shaft $p'$ is revolved in one direction the nut $p^3$ will be traversed by the screw $p^2$, so as to bring its strap or cross-bar $p^4$ against one set of stops $p^6$, and thus through the rods $p^5$ traverse the regulator $p$ to the right, so as to cause it to gradually inclose part of the rotary sieve $d^6$, while when the screw-shaft $p'$ is revolved in the opposite direction the strap or cross-bar $p^4$ of the nut $p^3$ will come against the other set of stops $p^{6*}$, with the opposite effect.

Upon a plain part of the screw-shaft $p'$, immediately above that part $d^{14}$ of the clutch fixed on the main shaft $b$, is loosely mounted a part clutch $p^7$, which is coupled with that $d^{14}$ of the main shaft by a driving band or strap $p^{7*}$, and upon the sleeve or shaft $d^{12}$ of the cylindrical sieve $d^6$ is fixed a toothed wheel $d^{12*}$, which gears with a similar toothed wheel $p^8$, fixed with a part clutch $p^9$, loosely mounted upon the plain part of the screw-shaft $p'$, and the part clutches $p^7 p^9$ are thus driven in opposite directions, while between the two loose part clutches $p^7 p^9$ upon the shaft $p'$ is mounted with capability of sliding, but fixed therewith as regards rotation, a double-ended part clutch $p^{10}$, adapted to gear with either one of the loose part clutches $p^7 p^9$.

The double-ended part clutch $p^{10}$ is loosely or revolubly connected with a strap or cross-bar $p^{11}$, similar to that $p^4$ of the nut $p^3$ and similarly perforated to slide upon the rods $p^5$ of the regulator $p$, and each of said rods is provided with a similar pair of adjustable stops $p^{12} p^{12*}$, between which the strap or cross-bar $p^{11}$ works, and said stops are so timed or adjusted that when the strap $p^4$ of the nut $p^3$ has come against one set $p^6$ of its coacting stops $p^{6*}$ upon the rods $p^5$, and thereby traversed the regulator more or less over the cylindrical sieve to diminish the flow of material from the hopper $d$, the stops $p^{12*}$ upon the rods $p^5$ will come against the strap $p^{11}$ of the double-ended part clutch $p^{10}$, thereby throwing said part clutch out of engagement with the part clutch $p^9$, which is driven in one direction, and into engagement with that $p^7$ which is driven in the opposite direction, and thus the direction of rotation of the screw-shaft $p'$ will be reversed. The nut $p^3$ will thus be traversed in the opposite direction, when by coming against the stops $p^{6*}$ the strap $p^4$ will similarly traverse the regulator $p$, so as to uncover the sieve $d^{6'}$, allowing the full flow of material until the stops $p^{12}$ of the rods $p^5$ come against the strap or cross-bar $p^{11}$, when the double-ended part clutch $p^{10}$ will be thrown out of gear with the part clutch $p^7$ and into gear with that $p^9$, when the direction of rotation of the shaft $p'$ will be reversed and the above operations will be repeated.

In order to insure the double-ended part-clutch $p^{10}$ being thrown into and held in gear with one or other of its coacting parts $p^7$ or $p^9$ and out of gear with the other and also to give a rapid final traverse to the regulator $p$, a kind of inverted pendulum or tumbler is employed, consisting of a rod $p^{13}$ at its lower end, pivotally mounted at $p^{13*}$ upon the hopper $d$ and at its upper end furnished with a weight $p^{14}$. The tumbler-rod $p^{13}$ works between two pins $p^{15}$, or it might be in a loop carried by a fitting $p^{15*}$, adjustably fixed upon one of the rods $p^5$ of the regulator $p$, so that the tumbler $p^{14}$ in the movement of the rods $p^5$ of the regulator in either direction will by the pins $p^{15}$ be thrown over beyond a vertical line drawn through its axis and will thus give a sudden final impulse to the regulator $p$ at the end of its traverse, thereby completing the cut-off and effecting the shifting of the double-ended part clutch $p^{10}$, while at the same time it serves to hold the regulator and regulator-rod $p^5$ at the end of their traverse, and consequently the double-ended part-clutch $p^{10}$ in gear with its coacting part.

By the arrangement of parts hereinbefore described when the cam-wheel $i$ is in its initial or normal position the clutch $d^{13}$ in the sleeve or hollow shaft $d^{12}$ of the cylindrical sieve $d^6$ will be in gear with the clutch $d^{14}$ of the main shaft $b$ and said sleeve will be driven and through its toothed wheel $d^{12*}$ give motion to the toothed wheel $p^8$ of the corresponding part clutch $p^9$, loose on the screw-shaft $p'$, and the double-ended part clutch $p^{10}$ being in gear therewith said shaft $p'$ will be rotated in a direction to at the proper time draw the regulator $p$ over the sieve $d^6$; but when the required weight is reached and the cam-wheel $i$ commences to turn the part clutch $d^{13}$ of the sleeve $d^{12}$ of the sieve $d^6$ will be thrown out of gear with the part clutch $d^{14}$ of the main shaft $b$ and the motion of the sieve will cease. At about this time the double-ended part clutch $p^{10}$ will be shifted into gear with the other loose part clutch, $p^7$, on the screw-shaft $p'$ and which by the band $p^{7*}$ is coupled with the part clutch $d^{14}$ on the main shaft $b$, and the direction of motion of the screw-shaft $p'$ will be reversed, thereby causing the regulator $p$ to be retracted.

In order to assist the steady flow of the material through the hopper $d$, a skeleton frame $q$, shaped to the form of the walls of the hopper $d$, is provided, and this frame is vertically vibrated at the desired times—that is to say, while the sieve $d^6$ is rotated through a depending rod $q'$ by means of a wheel or pinion $p^{8*}$, fixed with the sleeve of the part clutch $p^9$, which also carries the toothed wheel $p^8$, and which pinion $p^{8*}$ is provided with cam-teeth engaging the end of the depending rod $q'$.

By the means hereinbefore described an automatic weighing-machine is obtained which possesses many advantages compared with existing machines and among which may be named that up to the moment that the required weight of material in the bucket is reached the scale-beam is entirely unconnected with, and therefore unaffected by, the general moving mechanism of the machine, and consequently greater accuracy in weighing is possible, and after the required weight is reached the bucket is supported independently of the scale-beam while it is discharged, and thus the scale-beam and its centers are not subjected to the vibrations and shocks necessarily incidental to opening and closing the valve of the bucket. Furthermore, the automatic action of the regulator, which diminishes the stream of material flowing into the bucket as the load nearly approaches the required weight, and the variable speed automatically given to the cylindrical sieve greatly contribute to accurate weighing, while the positive motion given through the bell-crank to the cam-wheel at the commencement of the revolution of the latter also assists to the above end and increases the speed of the machine.

It will be understood that any other suitable receptacle than the bucket hereinbefore described arranged to discharge in any suitable way may be employed in connection with the other features of the invention and that some features of the invention, such as the automatic regulator and means for actuating it, may be employed in connection with other classes of machines than that hereinbefore described, and it will also be understood that the details of the invention may be considerably modified without departing from the spirit thereof.

Having now particularly described and ascertained the nature of the said invention and in what manner the same is to be performed, I declare that what I claim is—

1. In a weighing-machine, a constantly-driven shaft, a roughened wheel on said shaft, a cam-wheel adapted to engage the roughened wheel and having a depression or break in its periphery, a hopper into which the material to be weighed is fed, a valve controlling the mouth of the hopper, a weighing apparatus arranged beneath the hopper having a bucket or receptacle into which the material from the hopper flows, a support or detent, two studs or the like on the face of the cam-wheel, a bell-crank or the like mounted upon the cam-wheel and so arranged that in the normal position of the parts one arm thereof extends horizontally and engages the support or detent and the other arm rises vertically between the studs on the face of the cam-wheel, a horizontally-enlarged extremity to said vertical arm, a constantly-driven roughened wheel adapted to engage said enlargement, means actuated by the weighing apparatus when the required weight of material is deposited in the scale-bucket for tripping the support or detent and releasing the horizontal arm of the bell-crank and thereby throwing its vertical arm into engagement with its coacting roughened wheel and means actuated or set in action by the bell-crank and cam-wheel for closing the hopper-valve, discharging the scale-bucket and restoring the parts to their normal positions substantially as herein shown and described and for the purpose stated.

2. In a weighing-machine, a wheel, an axis, a bell-crank loosely mounted on the axis and adapted to give an initial impulse to the wheel, a detent or support normally holding the bell-crank in a given position and a driven wheel adapted to be engaged by and turn the bell-crank upon its axis upon the withdrawal of the detent substantially as herein shown and described and for the purpose stated.

3. In a weighing-machine, a wheel, an axis, a bell-crank loosely mounted upon the axis and adapted to give an initial impulse to the wheel, a detent constructed of ribbon-steel and at its lower end formed with an eye or the like adapted to engage an arm of the bell-crank, means for protecting and adjusting said detent and a driven wheel adapted to be engaged by and turn the bell-crank upon its axis upon the withdrawal of the detent, substantially as herein shown and described and for the purpose stated.

4. In a weighing-machine, a constantly-driven shaft, a roughened wheel on said shaft, a cam-wheel adapted to engage the roughened wheel and having a depression or break in its periphery, a hopper into which the material to be weighed is fed, a valve controlling the mouth of the hopper a pivotally-suspended arm carrying the valve and at its lower end provided with a nose, a spring for closing the shutter, a pin upon the cam-wheel for engaging the nose of the pivotal arm and opening the shutter, a detent for retaining the shutter in its open position, a weighing apparatus arranged beneath the hopper having a bucket or receptacle into which the material from the hopper flows, means set in motion by the weighing apparatus when the required weight of material is deposited in the scale-bucket for turning the cam-wheel until it engages its coacting driven wheel, means for concurrently tripping the detent of the hopper shutter or valve and means set in motion by the cam-wheel for discharging the scale-bucket and restoring the parts to their normal positions substantially as herein shown and described and for the purpose stated.

5. In a weighing-machine, a constantly-driven shaft, a roughened wheel on said shaft, a cam-wheel adapted to engage the roughened wheel and having a depression or break in its periphery, a hopper into which the material to be weighed is fed, a valve or shutter controlling the mouth of the hopper a spring for closing the valve or shutter, a detent for holding the shutter open, a weighing apparatus arranged beneath the hopper having a bucket or receptacle into which the material from the hopper flows, a support or detent, two studs or the like upon the face of the cam-wheel, a bell-crank or the like mounted upon the cam-wheel and so arranged that in the normal position of the parts one arm thereof extends horizontally and engages the support or detent and the other arm rises vertically between the studs on the cam-wheel, an enlarged extremity to the vertical arm, a constantly-driven roughened wheel adapted to engage said enlargement, a projection from said enlargement for tripping the detent of the hopper-shutter, means actuated by the weighing apparatus when the required weight of material is deposited in the scale-bucket for tripping the support or detent and releasing the horizontal arm of the bell-crank and thereby throwing its vertical arm into engagement with its coacting roughened wheel and tripping the detent of the shutter and means set in motion by the cam-wheel for discharging the scale-bucket and restoring the parts to their normal positions substantially as herein shown and described and for the purpose stated.

6. In a weighing-machine, a scale-bucket, a shutter or valve for closing the mouth of the scale-bucket, arms or links from which the shutter or valve is suspended, projections from said shutter, a pivotally-suspended arm having a pin working between said projections, a cam or incline upon the pivotal arm, a driven wheel, a pin upon said wheel for engaging said cam and swinging or traversing the pivotal arm in one direction to open the shutter and means for traversing it in the opposite direction to close the shutter substantially as herein shown and described and for the purpose stated.

7. In a weighing-machine, a scale-beam, a vertically-sliding rod extending through the table of the machine a spring normally retaining the rod in its raised position, a stop for limiting the upward movement of the rod, a roller upon the upper end of the rod, an intermittently-driven cam-wheel, a coacting cam upon the cam-wheel so shaped that in the stationary or normal position of the cam-wheel it is clear of the roller but in the rotation of the cam-wheel it engages said wheel and depresses the vertically-sliding rod and a branch from said rod provided with means adapted to engage a cross-bar of and depress the scale-beam substantially as herein shown and described and for the purpose stated.

8. In a weighing-machine, a scale-beam, a vertically-sliding rod, a spring normally retaining the rod in its raised position, a roller upon the upper end of the rod, an intermittently-driven cam-wheel, a coacting cam upon the cam-wheel, adapted to depress the rod at the required times, a branch from the vertically-sliding rod carrying a short chute adapted to be depressed by the cam of the cam-wheel against the top edge of the box or receptacle to receive the material at the time the scale-bucket is discharged substantially as herein shown and described and for the purpose stated.

9. In a weighing-machine, a hopper into which the material to be weighed is fed and from which it flows into a scale-bucket or receptacle, a cylindrical sieve in the lower part of the hopper, means for rotating the sieve, an imperforate cylinder or regulator adapted to slide over and inclose the cylindrical sieve and means for automatically sliding or traversing the regulator over the sieve thereby diminishing the flow of material from the hopper into the scale-bucket as the quantity of material in said bucket approaches the required weight and subsequently reversing said motion substantially as herein shown and described and for the purpose stated.

10. In a weighing-machine, a hopper into which the material to be weighed is fed and from which it flows into a scale-bucket or receptacle, a cylindrical sieve in the lower part of the hopper, a shutter or valve to the hopper, means for rotating the sieve and means for arresting the motion of the sieve when the hopper-shutter is closed substantially as herein shown and described and for the purpose stated.

11. In a weighing-machine, a constantly-driven shaft, a cylindrical sieve revolubly mounted above the hopper mouth or outlet, a shaft fixed with the sieve, a part clutch mounted upon said shaft with capability of sliding but fixed therewith as regards rotation, a coacting part clutch fixed with the main constantly-driven shaft of the machine, a fork or the like engaging the movable part clutch and acted upon by a spring to throw said clutch into action, a balanced lever by one end acting upon said fork to throw the clutch out of action, an intermittently-driven cam-wheel, a ring or cam upon the back of the cam-wheel upon which the other end of the lever rides during the revolution of the cam-wheel and the discharge of the scale-bucket when the hopper-shutter is closed and thus arrests the motion of the sieve during that period and a recess in said cam-ring into which the end of the lever falls in the normal or stationary position of the cam-wheel when the hopper-shutter is open and permits the spring of the fork to throw the clutch into action substantially as herein shown and described and for the purpose stated.

12. In a weighing-machine, a hopper, a cylindrical sieve revolubly mounted in the lower part of the hopper, a driven shaft giving motion to said sieve, an imperforate cylinder or regulator adapted to slide over the sieve, horizontally-sliding guide-rods connected with the regulator, a shaft threaded for part of its length and arranged parallel with the guide-rods, a nut working on said thread and revolubly connected with a strap loosely embracing the guide-rods, adjustable stops or collars upon the guide-rods between and against which the strap works to traverse the regulator in either direction, a loose part clutch upon a plain part of the screw-shaft driven in one direction by suitable means, a similar loose part clutch driven in the opposite direction, a double-ended part clutch mounted between the other part clutches upon the screw-shaft with capability of sliding but fixed therewith as regards rotation, a strap loosely engaging said double-ended clutch and also loosely engaging the guide-rods and adjustable collars or stops upon the guide-rods between which said strap works so that in the traverse of the regulator and guide-rods in either direction the double-ended part clutch will be moved out of gear with one driven part clutch and into gear with the other thereby reversing the direction of rotation of the screw-shaft substantially as herein shown and described and for the purpose stated.

13. In a weighing-machine, a hopper, a revoluble sieve in the delivery spout or mouth of the hopper, an imperforate cylinder or regulator adapted to slide over the sieve, a driven screw-shaft having a nut thereon, connecting-rods between the nut and the regulator, a plain part to the screw-shaft two part clutches loose thereon and driven in opposite directions, a double-ended clutch mounted upon the shaft between the part clutches with capability of sliding but keyed therewith as regards rotation, connections from the double-ended clutch to the regulator and a tumbler like an inverted pendulum mounted upon an axis of motion and two pins or the like upon one of the connecting-rods of the regulator between which the tumbler works substantially as herein shown and described and for the purpose stated.

14. In a weighing-machine, a cylindrical sieve revolubly mounted above the hopper mouth or outlet, a shaft fixed with the sieve, an imperforate cylinder or regulator adapted to slide over the sieve, guide-rods for traversing said regulator, a part clutch mounted upon the sieve-shaft with capability of sliding but fixed therewith as regards rotation, a coacting part clutch fixed with the main constantly-driven shaft of the machine, a screw-shaft parallel with the main shaft, a part clutch loosely mounted upon a plain part of the screw-shaft and driven by tooth-gearing from the sieve-shaft in one direction, a second part clutch mounted loosely upon the screw-shaft and driven from the main shaft in the opposite direction, a double-ended part clutch mounted between the part clutches of the screw-shaft with capability of sliding but fixed therewith as regards rotation, a strap loosely connected with said double-ended clutch and loosely engaging the guide-rods of the regulator, adjustable stops or collars upon said guide-rods at each side of the strap, a nut upon the threaded part of the screw-shaft, a strap loosely connected with said nut and loosely engaging the guide-rods of the regulator, adjustable stops or collars upon the guide-rods at each side of the strap, a fork or the like engaging the sliding part clutch of the sieve-shaft and acted upon by a spring to throw said part clutch into engagement with the coacting part clutch of the main shaft, a balanced lever by one end acting upon said fork to throw its part clutch out of action, a ring or cam upon the back of a cam-wheel upon which the other end of the lever rides and arrests the motion of the sieve during the revolution of the cam-wheel and a recess in said cam-ring into which the end of the lever falls in the normal position of the cam-wheel and causes the rotation of the sieve substantially as herein shown and described and for the purpose stated.

In witness whereof I have hereunto set my hand in the presence of two witnesses.

GEORGE PROKOFIEW.

Witnesses:
   C. McMOURNE WHITE,
   C. H. WHITE.